(12) United States Patent
Mohan et al.

(10) Patent No.: US 9,266,101 B2
(45) Date of Patent: Feb. 23, 2016

(54) VALUE ADDED SPENT FLUID CATALYTIC CRACKING CATALYST COMPOSITION AND A PROCESS FOR PREPARATION THEREOF

(75) Inventors: Prabhu K. Mohan, Faridabad (IN); A. V. Karthikeyani, Faridabad (IN); Manish Agarwal, Faridabad (IN); Biswanath Sarkar, Faridabad (IN); Balaiah Swamy, Faridabad (IN); V. Chidambaram, Faridabad (IN); P. S. Choudhury, Faridabad (IN); S. Rajagopal, Faridabad (IN)

(73) Assignee: INDIAN OIL CORPORATION LTD., Kolkata (IN)

( * ) Notice: Subject to any disclaimer, the term of this patent is extended or adjusted under 35 U.S.C. 154(b) by 403 days.

(21) Appl. No.: 13/808,817

(22) PCT Filed: Jul. 4, 2011

(86) PCT No.: PCT/IN2011/000442
§ 371 (c)(1),
(2), (4) Date: Mar. 21, 2013

(87) PCT Pub. No.: WO2012/004806
PCT Pub. Date: Jan. 12, 2012

(65) Prior Publication Data
US 2013/0168290 A1 Jul. 4, 2013

(30) Foreign Application Priority Data

Jul. 8, 2010 (IN) .............................. 746/KOL/2010

(51) Int. Cl.
*B01J 29/90* (2006.01)
*B01J 29/08* (2006.01)
*B01J 38/48* (2006.01)
*C10G 11/02* (2006.01)
*C10G 11/18* (2006.01)

(52) U.S. Cl.
CPC ................ *B01J 29/90* (2013.01); *B01J 29/084* (2013.01); *B01J 29/088* (2013.01); *B01J 38/485* (2013.01); *C10G 11/02* (2013.01); *C10G 11/18* (2013.01); *C10G 11/182* (2013.01); *C10G 2300/107* (2013.01); *C10G 2300/1077* (2013.01); *C10G 2300/701* (2013.01); *C10G 2300/703* (2013.01); *C10G 2300/705* (2013.01); *C10G 2400/02* (2013.01)

(58) Field of Classification Search
CPC ....................................................... B01J 29/90
See application file for complete search history.

(56) References Cited

U.S. PATENT DOCUMENTS

| | | |
|---|---|---|
| 4,337,144 A | 6/1982 | Yoo |
| 4,432,890 A | 2/1984 | Beck et al. |
| 4,814,066 A * | 3/1989 | Fu .............................. 208/120.15 |
| 4,919,787 A | 4/1990 | Chester et al. |
| 5,288,934 A * | 2/1994 | de Broqueville ............. 585/241 |
| 6,117,813 A * | 9/2000 | McCauley et al. ............ 502/303 |
| 2006/0076265 A1* | 4/2006 | Galiasso ........................... 208/3 |
| 2010/0286459 A1* | 11/2010 | Gauthier et al. .............. 585/303 |

OTHER PUBLICATIONS

International Search Report for PCT/IN2011/000442, dated Sep. 27, 2011.

* cited by examiner

*Primary Examiner* — Brian McCaig
(74) *Attorney, Agent, or Firm* — Maschoff Brennan

(57) ABSTRACT

A composition of a value added RFCC catalyst and a process of preparation of a composition for a dual function additive catalyst from a spent catalyst are disclosed. The value added spent FCC catalyst offers improved performance, options such as either employing as an additive for passivation of both vanadium and nickel and enhancing catalytic activity, for initial start-up or make-up for attrition losses. The value addition process does not harm any of physical properties of starting material with respect to ABD, attrition index, surface area and particle size distribution. Value added catalyst can be used in a range from 1-99 wt % in fluid catalytic cracking process in which, feeds may have higher metals and carbon.

35 Claims, No Drawings

VALUE ADDED SPENT FLUID CATALYTIC CRACKING CATALYST COMPOSITION AND A PROCESS FOR PREPARATION THEREOF

CROSS REFERENCE TO RELATED APPLICATIONS

This application is a National Stage of International Application No. PCT/IN2011/000442 filed Jul. 4, 2011, claiming priority based on India Patent Application No. 746/KOL/2010, filed Jul. 8, 2010, the contents of all of which are incorporated herein by reference in their entirety.

FIELD OF INVENTION

The present invention relates to a value added spent Fluid Catalytic Cracking (FCC) catalyst composition from a low activity spent FCC catalyst. This invention also relates to a process for preparation thereof. The invention particularly relates to a value added FCC catalyst composition from spent FCC catalyst offering dual functions of simultaneous passivation of metals and also for enhancement of catalytic activity of host Resid Fluid Catalytic Cracking (RFCC) catalyst for processing heavy metal laden feeds in petroleum processing industry. This invention also relates to various value addition processes of spent FCC catalyst.

BACKGROUND OF THE INVENTION

The present invention relates to Fluid Catalytic Cracking (FCC) catalysts and the process for preparation wherein the value added FCC catalyst composition offering dual functions of simultaneous passivation of metals and also for enhancement of catalytic activity of host Resid Fluid Catalytic Cracking (RFCC) catalyst for processing heavy metal laden feeds in petroleum processing industry. This invention also relates to various value addition processes of spent FCC catalyst.

Fluid Catalytic Cracking (FCC) catalysts used today in cracking process are not so cost effective hence increasing cost of crude is forcing refineries to process the hydrocarbon feeds having high carbon residue, nitrogen, aromatics and heavy metal contaminants such as nickel and vanadium to be efficiently used in the refinery industry. Among all the contaminants present in feeds, metal contaminants pose the greatest challenge, as some of them permanently cripple the catalytic activity while some metals produce undesired products such as coke and dry gas. Nickel is well known for dehydrogenation of feed and products under normal FCC operation conditions thereby producing higher coke and dry gas. These effects are predominant with catalysts having higher surface area. Vanadium, unlike nickel, is known for zeolite destroying property and for even worse effects by hopping from aged catalyst particle to fresh catalyst particle while carrying out the destructive action. Vanadium pentoxide, formed during severe regeneration operation, gets converted to vanadic acid which reacts with structural alumina of zeolite and also with structure supporting rare earth species. Presence of vanadium in the feed can permanently reduce activity of the FCC catalyst. Processing such feeds create increasing demand for catalysts having higher metal tolerance. Such a process which processes heavy feeds sourced from streams such as inter oil, heavy oil, deashphalted oil, short residue, heavy gas oil, coker gasoil having nickel in the range 8-50 ppm and vanadium in the range 15-120 ppm while employing high matrix metal tolerant catalysts is known as Resid Fluid Catalytic Cracking (RFCC). Spent catalysts in these processes, accumulate total metals in the range 1-3 wt %. As discussed earlier, nickel and vanadium are the most prominent among all the metals requiring remedy for their undesired properties. Besides, as the catalyst produces higher coke while processing resid feeds, for withstanding higher temperature of catalyst regeneration process, hardware needs to have improved metallurgy. Catalysts employed for RFCC operations need to be robust towards high temperature regeneration, steam stripping and metal environment under the dynamic conditions of RFCC operation. Due to higher rate of catalyst deactivation in presence of metals and operational severity, catalyst make-up rate is higher in case of RFCC, which is in the range 4-15 wt % of inventory against 0.4-5 wt % in case of FCC. It may be noted, due to lower deactivation rate and having lower metals in spent FCC catalysts, there is a significant activity left in such spent catalysts and used for initial start-up or for make-up in RFCC/FCC units.

Catalyst manufacturers, often produce less robust catalysts which are cheaper and produced from normal NH4Y zeolite and conventional binders. Such catalysts on withdrawal from the plant cannot be re-employed for start-up or for make-up in case of RFCC units. On the contrary, RFCC catalysts are produced from thermally stable high silica-alumina USY zeolites and employing components desired for high temperature operation, enhancing metal stability etc. Inference can be drawn; catalysts employed for VGO/soft feed processing may not be suitable for RFCC operation. RFCC operation, besides employing high active thermally stable catalysts may additionally use metal passivator additives. Though, it is desirable to reuse spent or E-catalyst from FCC for RFCC start-up or for make-up in view of improving the economy of process, often due to requirement of higher metal and thermal stability, spent catalysts could not be exploited for RFCC. The present invention describes a process and composition for the preparation of RFCC catalyst from spent FCC catalyst for further use in RFCC.

U.S. Pat. No. 5,520,797 and U.S. Pat. No. 4,359,379 describe processes for the fluid catalytic cracking of heavy oils rich in Ni and V by withdrawing a portion of ferrite-containing catalyst particles circulating in a fluid catalytic cracking apparatus, by using a magnetic separator.

U.S. Pat. No. 5,188,995 refers to a process in which spent metal-contaminated zeolite-containing catalytic cracking catalyst is reactivated by a process which comprises contacting the spent catalyst with at least one dissolved carboxylic acid and at least one antimony compound. This invention more particularly describes a method of reactivating spent, metal-contaminated zeolite-containing catalytic cracking catalysts. In another aspect, this invention relates to a catalytic cracking process employing a reactivated spent catalytic cracking catalyst.

U.S. Pat. No. 5,151,391 refers to a process in which, spent metal contaminated zeolite-containing catalytic cracking catalyst composition is reactivated by a process which comprises contacting with an aqueous solution of HCl and/or $HNO_3$ and/or $H_2SO_4$. Thus reactivated catalyst composition can be employed in a catalytic cracking. Further this invention relates to a method of reactivating spent, metal-contaminated zeolite-containing catalytic cracking catalysts. In another aspect, this invention relates to a catalytic cracking process employing a reactivated spent catalytic cracking catalyst.

U.S. Pat. No. 5,888,919 refers to a process in which a spent zeolite-containing hydrocarbon cracking catalyst is treated by regenerating it to remove carbonaceous deposits. A portion of the regenerated catalyst is withdrawn from the circulating catalyst inventory of a hydrocarbon processing unit and slurried with a liquid containing an activating agent. This invention relates to process for improving the activity of fluid catalytic cracking (FCC) or moving bed cracking (TCC) catalyst, including any additives containing zeolitic material as one of the active components and which may be employed with each type catalyst, which process can be integrated with the operations of the hydrocarbon processing unit in which the catalyst is employed.

U.S. Pat. No. 4,919,787 refers to a process for an improved method for passivating metals in a hydrocarbon feedstock during catalytic cracking. Further this invention involves contacting the feedstock with a passivating agent comprising a precipitated porous rare earth oxide, alumina, and aluminum phosphate precipitate. The passivating agent may be coated on a cracking catalyst, be part of the matrix of a cracking catalyst, or be added to the cracking operation as discrete particles.

Patent number EP73874B1 discloses Immobilisation of vanadia deposited on catalytic materials during the conversion of oil that contains coke precursors and heavy metals. US application 20100025297A1 discloses additives for metal contaminant removal. catalytic cracking additives comprising a metal trapping material; and a high activity catalyst. This invention is directed to processes for the catalytic cracking of feedstock comprising contacting said feedstock under catalytic cracking conditions with a composition comprising a bulk catalyst and a catalytic cracking additive, wherein the catalytic cracking additive comprises a metal trapping material; and a high activity catalyst.

Therefore, there is a need to provide an improved process and a catalyst composition for converting low activity, low metal tolerant spent FCC catalyst to an efficient catalyst composition to be used in RFCC process for enhancing metal tolerance and also for enhancing catalytic activity of host catalyst for a more efficient and cost effective method.

The present invention is aimed at avoiding or overcoming the difficulties or limitations encountered to provide an improved process and a catalyst composition for catalytic cracking of heavy oils in petroleum processing industry.

It will be advantageous to have a composition and an efficient process to prepare the composition for employing low activity, low metal tolerant spent FCC catalyst for further use in RFCC in enhancing metal tolerance and also in enhancing catalytic activity of host catalyst.

It will be advantageous to have a product from spent catalyst, which will enhance the catalytic activity and selectivity of spent catalysts in adverse RFCC operation conditions.

It will also be advantageous to have an efficient process and a product from spent catalyst, which will enhance the catalytic activity and selectivity of spent catalysts in adverse RFCC operation conditions.

Furthermore, a product and process for improving thermal and metal stability of spent catalyst through impregnation with metal passivation composition, while this value added spent catalyst can be employed as an additive in RFCC process will be beneficial.

Still further, a process for the preparation of a thermal and metal stable RFCC catalyst from spent catalyst for processing metal laden heavy feeds will be advantageous.

It will be also advantageous to have a process, by which application of metal passivation composition on spent catalyst, enhances crystallinity and surface area of a host catalyst.

Process and composition for preparation of a thermal and metal tolerant catalyst from spent FCC catalyst which can be employed in RFCC process as an additive or as a whole metal tolerant RFCC catalyst will be beneficial.

The present invention is aimed to provide an efficient process and a composition for employing low activity, low metal tolerant spent FCC catalyst for further use in RFCC in enhancing metal tolerance and also in enhancing catalytic activity of host catalyst.

It is another advantage of the invention to provide an efficient process and a product from spent catalyst, which will enhance the catalytic activity and selectivity of spent catalysts in adverse RFCC operation conditions.

It is yet another advantage of the invention to provide a process for improving thermal and metal stability of spent catalyst through impregnation with metal passivation composition, while this value added spent catalyst can be employed as an additive in RFCC process.

It is still another advantage of the invention to develop a process for the preparation of a thermal and metal stable RFCC catalyst from spent catalyst for processing metal laden heavy feeds.

It is yet another advantage of the invention to provide a process, by which application of metal passivation composition on spent catalyst, enhances crystallinity and surface area of a host catalyst.

It is yet further advantage of the invention to develop a process and composition for preparation of a thermal and metal tolerant catalyst from spent FCC catalyst which can be employed in RFCC process as an additive or as a whole metal tolerant RFCC catalyst.

DETAILED DESCRIPTION OF THE INVENTION

According to the invention there is provided a value added spent Fluid Catalytic Cracking (FCC) catalyst composition comprising spent FCC catalyst introduced thereto a substance (activity enhancer) selected from either a rare earth component or an aluminium component or a mixture/combination of the two. The meaning of value addition includes addition of property to the spent FCC catalyst providing dual function for simultaneous passivation of metals and also for enhancing catalytic activity of host Resid Fluid Catalytic Cracking (RFCC) catalyst for processing heavy metal laden feeds in petroleum processing industry. The value addition further means enhancement of thermal and metal tolerance/stability. The value addition also means enhanced catalytic activity and selectivity of spent catalyst in adverse RFCC operation conditions. The value addition further means enhanced crystallinity and surface area of a host catalyst.

According to this invention there is also provided a process for preparing the said value added fluid catalytic cracking catalyst which comprises introducing a rare earth and/or an aluminium containing substance to spent FCC catalyst. The rare earth and/or aluminium containing substance is/are used here as an activity enhancer. The rare earth substance can be selected from one or more rare earth metal compounds preferably Lanthanum compounds. Broadly the rare earth compounds can be selected from the sources of oxides, hydroxides, chlorides, nitrates, sulphates, oxalates, carbonates, acetates, formates and hydrates but free from soda. The preferred compound is oxide. The most preferred compound is Lanthanum rich compound, which leaves minimum anionic residue on process step of high temperature calcination. The aluminium component according to this invention is one or more compounds of aluminium and is selected from aluminium oxide, hydroxide, chloride, nitrate, sulphate, acetate, oxalate, hydroxychloride, hydroxyl nitrate, hydroxyl sulphate and hydrate but free froth soda. The preferred compound of aluminum should be capable of leaving least anionic residue on process step of high temperature calcination. The starting spent FCC catalyst has aluminium in the range of 20-55 wt %, silica 20-60 wt %, sodium oxide less than 0.5 wt %, vanadium 200-2000 ppm, nickel 100-1500 ppm and rare earth oxide 0.5-3 wt %. The starting spent FCC catalyst has a surface area of 50-170 m$^2$/gm, particle size of 20-120 microns and apparent bulk density of 0.70-0.90 gm/ml. The value added catalyst of the invention has an apparent bulk density of 0.70-0.98 gm/ml and an attrition index of 0.1-10. The proportion of the activity enhancer introduced to the spent catalyst is such that the obtained value added catalyst has aluminium in the range of 20-60 wt %, silica 20-50 wt %, sodium oxide less than 0.5 wt %, titanium oxide less than 0.5 wt %, vanadium 200-2000 ppm, nickel 100-1500 ppm and rare earth oxide 1-13.5 wt %. The value added catalyst of the invention can be employed as an additive to host RFCC catalyst or as a whole metal tolerant RFCC catalyst. The rare earth and/or aluminium compound as activity enhancer can be loaded in 0.5-10 wt % of spent catalyst on oxide basis. The spent catalyst after loading with activity enhancer can be used in RFCC process as a dual function additive for both metal passivation and activity enhancement, quantity ranging from 1-99 wt %. The introduction of the activity enhancer is carried out by wet impregnation, ion-exchange or feeding along with hydrocarbon feed in actual plant operation.

In one embodiment the process for preparing dual function catalyst additive from spent FCC catalyst comprises the following sequence of steps:

a) Preparing a rare earth and/or aluminium containing solution, b) Wet impregnating spent FCC catalyst with a solution of step (a)

c) Oven drying wet impregnated spent catalyst of step (b) and d) Calcination of oven dried product of step (c)

In another embodiment the invention provides a process for catalytic cracking of hydrocarbons to provide higher conversion, naphtha yield and lower bottoms by using the value added spent catalyst. In yet another embodiment there is provided a process for improving thermal and metal stability of spent FCC catalyst comprising treating the spent FCC catalyst with the activity enhancer selected from either rare earth or an aluminium component or a mixture/combination of the two. In still another embodiment, the invention deals with the process of catalytic cracking of hydrocarbons wherein the value added spent catalyst is added to a host cracking catalyst in a proportion ranging from 1-99 wt % during the catalytic cracking of hydrocarbons containing vanadium and nickel as undesirable constituents and for preventing the adverse effects of vanadium and nickel on the activity of the host cracking catalyst. In yet another embodiment of the invention there is provided a process for enhancing the catalytic activity and selectivity of spent FCC catalyst in adverse RFCC conditions comprising treating spent FCC catalyst with the activity enhancer as described above. In still another embodiment there is provided a process which enhances the crystallinity and surface area of a host FCC catalyst by applying the activity enhancer as stated above. Components of the catalyst with their specific embodiments are further described on component by component basis.

Spent Catalyst—Fresh FCC/RFCC catalysts are produced from shape selective zeolite material either in ammonia or in rare earth form content ranging from 20-45 wt %. These zeolites are bonded by either silica or alumina or by silica-alumina composite, while clay is used as a diluent/heat sink/low cost filler. Fresh catalysts generally possess very high microactivity (vacuum gas oil conversion) and have surface area in the range 180-300 m$^2$/gm and Y-zeolite crystallinity above 20% while unit cell size (UCS) above 24.40° A. As these catalysts pass through high temperature and steam zones in FCC/RFCC unit, thereby undergo severe degradation during initial few hours dwell in the unit. Degradation is in terms of surface area, crystallinity and UCS. This is reflected in catalyst performance, where it steeply falls from over 70% to below 65%. After initial few hours steep fall in these parameters, further fall is gradual. During initial stage in the catalyst plant, the zeolite component present in the catalyst undergoes severe dealumination, while silica from matrix keeps healing those vacancies. A stage will be reached where, there is an equilibrium. Such a catalyst is named as equilibrium catalyst (E-catalyst) and will have more or less stable activity. Further, dwell of E-catalyst in the plant, will cause gradual degradation on activity and a stage will be reached where further continuation of catalyst will offset economic benefits over fresh catalyst performance. At this time, considerable amount of catalyst is withdrawn from the plant and substituted with fresh catalyst. Such a catalyst is known as spent catalyst and will have surface area in the range 50-170 m$^2$/gm, while Y zeolite crystallinity is in the range 7-15%. Spent catalyst may have metals such as vanadium in the range 200-2000 ppm and nickel from 100-1500 ppm in case of VGO (FCC) operation. These metal levels are much higher in case of RFCC units in the range 5000-15000 ppm vanadium and 2000-7000 ppm nickel. The crystallinity and surface area of spent catalyst samples is lower compared to FCC catalysts due to higher operational severity and higher deactivation due to metals.

Activity Enhancer—Oxides of alumina and rare earth have been found to be very effective in enhancing the activity of spent catalyst products. These can be introduced to spent catalyst by wet impregnation, ion-exchange, feeding along with hydrocarbon feed in actual plant operation. Salts of lanthanum, aluminium such as chlorides, sulphates, nitrates, acetates, oxalates can be employed for wet impregnation or ion-exchange. Besides, their respective hydroxide can also be employed. These elements need to be introduced in an optimum range as per requirement in the range 0.5 to 10 wt %, on oxide basis. Following the introduction of activity enhancer, spent catalyst can be used in RFCC process in the range 1 to 99 wt % as a dual function additive.

EXAMPLES

The present invention is further explained in the form of following examples. However, these examples should not be construed as limiting the scope of the invention.

Example 1

This example illustrates effect of steaming on surface area and X-ray crystallinity on spent FCC catalyst, drawn from FCC unit employed for cracking of light gasoil, when steamed at 750° C., for 1 hour in presence of 100% steam. It is found surface area of spent FCC catalyst reduced from 156 m$^2$/gm to 134 m$^2$/gm upon steaming. Similarly, X-ray crystallinity also dropped from 8.4% to 6.5%.

Example 2

This example shows effect of steaming on metal loaded spent catalyst. For this, spent FCC catalyst was doped with 10500 ppm of vanadium and 4000 ppm of nickel employing Mitchell method (Julius Scherzer-1) following which, steamed at 750° C., for 3 hours in presence of 100% steam. It is found surface area of metal impregnated steamed spent catalyst reduced to 57 m²/gm. Similarly, X-ray crystallinity also dropped from 8.4% to 4%.

Example 3

This example illustrates a procedure for enhancing steam and metal stability of spent FCC catalyst. Spent FCC catalyst, referred in example 1 was calcined at 500° C. for 1 hour and cooled in a desiccator. 300 gm of calcined spent catalyst was divided into 3 equal parts and subjected to wet impregnation with required concentration of rare earth nitrate solution (minimum of 85 wt % $La_2O_3$, maximum 2 wt % $Pr_6O11$, maximum 5 wt % $Nd_2O_3$, maximum 1 wt % $Ce_2O_3$ and non-rare earth impurities such as $Fe_2O_3$, CaO, MgO, $TiO_2$ maximum up to 1.5 wt % represented on volatile free basis) to give final dry catalyst having 2 wt %, 4 wt %, 6 wt % rare earth oxide on volatile free basis. Thus prepared catalysts were oven dried at 120° C. for 12 hours and calcined to 500° C. for 1 hour.

RFCC catalyst having crystallinity 25%, surface area 300 m2/gm, 10 wt % of value added spent catalysts prepared under example 3, 4 and 5 were blended in independent experiments, while one reference catalyst was prepared by blending 10 wt % of spent catalyst, employed as starting material. All of seven blends were doped with 10500 ppm of vanadium and 4000 ppm of nickel employing respective vanadium and nickel metals naphthenates. For this well established Mitchell method was employed. All the seven blends were oven dried at 120° C. for 3 hours and calcined at 500° C. for 1 hour followed by steaming at 750° C. for 3 hours under 100% steam. Fresh and steamed composites were characterized for surface area, X-ray crystallinity and composition. The physico-chemical properties of fresh and steamed blends are shown in Table-1. Performance evaluation of reference and value added blend catalyst was carried in an ACE MAT unit employing standard procedure and feed. The feed properties are shown in Table-2. Performance data comparison is shown in Table-3.

TABLE 1

Physico-chemical properties of spent catalyst and blend of value added catalyst in fresh catalyst

| Sample description | | | | 10 wt % blend of E-cat after impregnating $Re_2O_3$ and $Al_2O_3$, in fresh RFCC catalyst, metal doped and steamed | | | | |
|---|---|---|---|---|---|---|---|---|
| Performance enhancer source | Base catalyst (spent) | | | Lanthanum nitrate as lanthanum source | | | La-acetate | Aluminum nitrate |
| Performance enhancer, in spent catalyst | As such | Steamed | Metal doped steamed | 2 wt % $La_2O_3$ | 4 wt % $La_2O_3$ | 6 wt % $La_2O_3$ | 6 wt % $La_2O_3$ | 6 wt % $Al_2O_3$ |
| Surface area, m²/g | 154 | 134 | 57 | 79.5 | 95.8 | 100 | 101 | 85 |
| X-ray crystallinity, %, | 8.4 | 6.5 | 4 | 8 | 10 | 12 | 12 | 9.5 |

Example 4

This example offers a procedure for enhancing steam and metal stability of spent catalyst, employing lanthanum acetate of purity 99% as a rare earth source, replacing rare earth nitrate under example 3. Spent catalyst was wet impregnated to give 6 wt % of $La_2O_3$ on volatile free basis from a required quantity and concentrated solution of lanthanum acetate.

Example 5

This example offers a procedure for enhancing steam and metal stability of spent catalyst, employing aluminum nitrate of purity 99% as an aluminum source in place of lanthanum under example 3. Spent catalyst was wet impregnated to give 6 wt % of $Al_2O_3$ on volatile free basis from a required quantity and concentrated solution of aluminum nitrate.

Example 6

This example refers to the performance of value added spent catalysts prepared under examples 3, 4 and 5. To a fresh

TABLE 2

Properties of RFCC Feed used for Testing Performance of value added spent catalyst samples.

| Property | Test Result |
|---|---|
| Density at 15 deg. C., g/cc (Test Method IP 190) | 0.938 |
| CCR, % wt (Test Method ASTM D189) | 4.0 |
| Boiling Range, % vol at deg. C., (Test Method ASTM D1160) | |
| IBP | 280 |
| 5 | 355 |
| 10 | 390 |
| 50 | 455 |
| 70 | 480 |
| 80 | 495 |
| 100 | >520 |
| FBP | — |
| Sulfur Content, % wt | 1.7 |
| Metal Contaminants: | |
| Ni, ppm | 6.93 |
| V, ppm | 22.5 |

TABLE 3

Performance of Steam Deactivated Catalyst Samples of Example 3, 4 and 5

| Composition | 100% reference base catalyst | 90% base* + 10 wt % of Example 3 product (Re2O3: 6 wt %) | 90% base* + 10 wt % of Example 4 product (Re2O3: 6 wt %) | 90% base* + 10 wt % of Example 5 product (Al2O3: 6 wt %) |
|---|---|---|---|---|
| Temperature, ° C. | 510 | 510 | 510 | 510 |
| C/O | 6.02 | 6.02 | 6.02 | 6.02 |
| Yields, wt % | | | | |
| Dry gas | 2.468 | 2.508 | 2.476 | 3 |
| LPG | 2.734 | 5.855 | 5.980 | 5.49 |
| Gasoline | 8.116 | 12.858 | 12.549 | 12.38 |
| Heavy naphtha | 6.258 | 8.114 | 7.732 | 6.01 |
| Light Cycle Oil | 25.963 | 24.940 | 24.961 | 26.567 |
| Clarified Oil | 43.035 | 33.73 | 34.289 | 33.687 |
| Coke | 11.427 | 11.995 | 12.014 | 12.84 |
| Conversion | 31.00 | 41.33 | 40.75 | 39.72 |

*Base catalyst is fresh RFCC catalyst with 300 m2/g surface area, crystallinity 25%.

REFERENCES

Fluid Catalytic Cracking: Science and technology, Volume 76, J. S Magee, M. M Mitchell, jr (Elesevier, 1993), Page-242.

We claim:

1. A value added fluid catalytic cracking (FCC) catalyst composition consisting essentially of spent FCC catalyst introduced thereto a substance (activity enhancer) selected from either an aluminium component or a mixture/combination of rare earth component and an aluminium component.

2. A composition as claimed in claim 1, wherein the substance is an aluminium compound.

3. A composition as claimed in claim 1, wherein the substance is a mixture/combination of rare earth compound and an aluminium compound.

4. A composition as claimed in claim 1, wherein the rare earth compound is selected from one or more of rare earth compounds.

5. A composition as claimed in claim 1, wherein the rare earth compound is selected as a Lanthanum compound.

6. A composition as claimed in claim 1, wherein the rare earth compound is selected from the sources of rare earth oxides, -hydroxides, -chlorides, -nitrates, -sulphates, -oxalates, -carbonates, -acetates, -formates and -hydrates but free from soda.

7. A composition as claimed in claim 6, wherein the rare earth compound is selected as oxide.

8. A composition as claimed in claim 1, wherein the aluminium compound is selected from the sources of aluminium oxide, -hydroxide, -chloride, -nitrate, -sulphate, -acetate, -oxalate, -hydroxychloride, -hydroxyl nitrate, -hydroxyl sulphate and -hydrate but free from soda.

9. A composition as claimed in claim 8, wherein the aluminium compound is selected as oxide.

10. A composition as claimed in claim 1, wherein the rare earth and aluminium compounds are both used as oxides.

11. A composition as claimed in claim 1, wherein the substance (activity enhancer) introduced is in the range of 0.5-10 wt % on oxide basis.

12. A composition as claimed in claim 1, wherein the spent FCC catalyst has aluminium in the range of 20-55 wt %, silica 20-60 wt %, sodium oxide less than 0.5 wt %, vanadium 200-2000 ppm, nickel 100-1500 ppm, titanium oxide less than 0.5 wt % and rare earth oxide 0.5 to 3 wt %.

13. A composition as claimed in claim 1, wherein the spent FCC catalyst has a surface area of 50-170 m2/gm, particle size of 20-120 microns and apparent bulk density of 0.70-0.90 gm/ml.

14. A composition as claimed in claim 1, wherein said composition has an apparent bulk density of 0.70-0.98 gm/ml and an attrition index of 0.1-10.

15. A composition as claimed in claim 1, wherein the proportion of the substance (activity enhancer) introduced to the spent catalyst is such that the value added catalyst composition has aluminium in the range of 20-60 wt %, silica 20-50 wt %, sodium oxide less than 0.5 wt %, titanium oxide less than 0.5 wt %, vanadium 200-2000 ppm, nickel 100-1500 ppm and rare earth oxide 1-13.5 wt %.

16. A catalyst composition as claimed in claim 1 which is capable to be added to a host cracking catalyst in proportions ranging from 1-99 wt % during the catalytic cracking of hydrocarbons containing vanadium and nickel as undesirable constituents, and for preventing the adverse effects of vanadium and nickel on the activity of the host cracking catalyst.

17. A process for preparing a value added spent fluid catalytic cracking (FCC) catalyst composition consisting essentially of introducing either an aluminium containing compound or a mixture/combination of rare earth and an aluminium containing substance (activity enhancer) to spent FCC catalyst.

18. A process as claimed in claim 17, wherein an aluminium containing substance is introduced.

19. A process as claimed in claim 17, wherein a mixture or combination of both rare earth and aluminium containing substance is introduced.

20. A process as claimed in claim 19, wherein rare earth and aluminium compounds selected are as their oxides.

21. A process as claimed in claim 17, wherein the rare earth containing substance is selected from one or more of the sources of rare earth oxides, hydroxides, -chlorides, -nitrates, -sulphates, -oxalates, -carbonates, -acetates, -formates and hydrate but free from soda.

22. A process as claimed in claim 17, wherein the rare earth containing substance is a rare earth oxide.

23. A process as claimed in claim 17, wherein the rare earth containing substance is Lanthanum oxide.

24. A process as claimed in claim 17, wherein the aluminium containing substance is selected from one or more of aluminium oxide, -hydroxide, -sulphate, -chloride, -nitrate, -hydroxy chloride, -hydroxyl nitrate, -hydroxyl sulphate, -acetate, -oxalate and -hydrate but free from soda.

25. A process as claimed in claim 24, wherein the aluminium containing substance is aluminium oxide.

26. A process as claimed in claim 17, wherein the spent FCC catalyst has aluminium in the range of 20-55 wt %, silica 20-60 wt %, sodium oxide less than 0.5 wt %, vanadium 200-2000 ppm, nickel 100-1500 ppm, rare earth oxide 0.5-3 wt %.

27. A process as claimed in claim 17, wherein the spent FCC catalyst has a surface area of 50-170 m2/gm, particle size of 20-120 microns and apparent bulk density of 0.70-0.90 gm/ml.

28. A process as claimed in claim 17, wherein the proportion of rare earth and/or aluminium containing substance to the spent FCC catalyst is such that the obtained value added catalyst has aluminium in the range of 20-60 wt %, silica 20-50 wt %, sodium oxide less than 0.5 wt %, titanium oxide less than 0.5 wt %, vanadium 200-2000 ppm and rare earth oxide in the range of 1-13.5 wt %.

29. A process as claimed in claim 17, wherein the introduction of the activity enhancer is carried out by wet impregnation, ion-exchange or feeding along with hydrocarbon feed in actual plant operation.

30. A process as claimed in claim 17, wherein the proportion of activity enhancer substance with respect to spent FCC catalyst is in the range of 0.5-10 wt % on oxide basis.

31. A process as claimed in claim 17, wherein the process improves thermal and metal stability of the spent FCC catalyst.

32. A process as claimed in claim 17, wherein the process enhances catalytic activity and selectivity of the spent FCC catalyst in adverse residue fluid catalytic cracking conditions.

33. A process as claimed in claim 17, wherein the process enhances crystallinity and surface area of a host FCC catalyst.

34. A process for preparing dual function catalyst additive composition from spent FCC catalyst comprising the following sequence of steps:
   a) preparation of an aluminium containing solution or rare earth and aluminium containing solution,
   b) wet impregnation of spent FCC catalyst with a solution of step (a),
   c) oven drying of wet impregnated spent catalyst of step (b),
   d) calcination of oven dried product of step (c).

35. A process as claimed in claim 34, wherein the spent catalyst is added to a host cracking catalyst in a proportion ranging from 1-99 wt % during the catalytic cracking of hydrocarbons containing vanadium and nickel as undesirable constituents, and for preventing the adverse effect of vanadium and nickel on the activity of the host cracking catalyst.

* * * * *